US012755117B1

(12) United States Patent
Gurevich et al.

(10) Patent No.: US 12,755,117 B1
(45) Date of Patent: Oct. 6, 2026

(54) COMPACT SINGLE-CAMERA SYSTEM EMULATING MULTI-CAMERA SYSTEM

(71) Applicant: Zebra Technologies Corporation, Lincolnshire, IL (US)

(72) Inventors: Vladimir Gurevich, Great Neck, NY (US); Matthew Lawrence Horner, Sound Beach, NY (US); David P. Goren, Smithtown, NY (US); Christopher W. Brock, Manorville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 19/313,746

(22) Filed: Aug. 28, 2025

(51) Int. Cl.

| | |
|---|---|
| ***G06K 7/14*** | (2006.01) |
| ***G02B 27/02*** | (2006.01) |
| ***G03B 13/34*** | (2021.01) |
| ***G06K 7/10*** | (2006.01) |
| *H04N 23/667* | (2023.01) |

(52) U.S. Cl.
CPC ......... *G06K 7/1413* (2013.01); *G02B 27/021* (2013.01); *G03B 13/34* (2013.01); *G06K 2007/10524* (2013.01); *H04N 23/667* (2023.01)

(58) Field of Classification Search
CPC ...... G06K 7/1413; G06K 7/14; G06K 7/1417; G03B 13/64
USPC ............ 235/462.45, 472.01, 462.43, 462.01, 235/462.11, 462.1
See application file for complete search history.

(56) References Cited

U.S. PATENT DOCUMENTS

| | | | | |
|---|---|---|---|---|
| 2009/0152440 | A1 * | 6/2009 | Altendorf | G02B 7/32 250/201.4 |
| 2009/0166543 | A1 * | 7/2009 | Vinogradov | G02B 3/14 250/370.08 |
| 2009/0224051 | A1 * | 9/2009 | Vinogradov | G06K 7/10702 235/462.41 |
| 2015/0310243 | A1 * | 10/2015 | Ackley | G02B 5/005 235/462.24 |
| 2019/0261853 | A1 * | 8/2019 | Williamson | A61B 3/14 |
| 2021/0400193 | A1 * | 12/2021 | Ma | H04N 23/55 |

* cited by examiner

*Primary Examiner* — Edwyn Labaze

(57) ABSTRACT

Imaging devices, systems, and methods for capturing color image data and selectively process that image data under different operation modes are described herein. An example imaging device includes an imaging assembly having an optical variable focus lens assembly, an optical variable aperture, and an imager configured to capture images of a field of view of the indicia reader; a controller in communication with the optical variable focus lens assembly and with the optical variable aperture to control a focus of the lens assembly and an entrance pupil defined by the optical variable aperture. The imaging device executes instructions to operate the imaging device reader in at least one of two modes for capturing image data, a first mode having a first entrance pupil and a second mode having a second entrance pupil larger than the first entrance pupil, wherein the first mode is a fixed focus position mode and the second mode is an autofocus mode.

19 Claims, 3 Drawing Sheets

COMPACT SINGLE-CAMERA SYSTEM EMULATING MULTI-CAMERA SYSTEM

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Barcode reading systems have long been used both to capture and decode barcode data, as well as to perform other image analysis operations. Some such image analysis operations are better or only able to be performed on color images. However, decoding operations are generally better performed on monochrome images. To perform both types of operations, barcode reading systems traditionally integrate multiple imaging sensors (e.g., monochromatic and color imaging sensors) and/or perform color to monochrome conversion techniques. These barcode reading systems would typically integrate multiple imaging sensors each with its own optics so that each imaging sensor is configured to capture image data over a different distance4 from the barcode reading system. These multi-camera systems are useful because they can combine various functions in one device, such as fast barcode scanning in in the near-distance combined with long-distance barcode reading and color picture taking.

In these multi-camera systems, the fast barcode scanning is done best at relatively short target distances, in particular, using a monochromatic fixed-focus camera with small-aperture (<1 mm). The small aperture increases depth of focus, such that barcodes can be decoded even from dark images using built-in illumination system. At the same time, decoding distant barcodes, i.e., beyond the range of built-in illumination system, requires a large aperture (>2 mm) to collect enough ambient light for the monochromatic sensor. However, these large apertures lead to small depth of focus and, therefore, requiring an auto-focus lens, not a fixed-focus camera. Further complicating multi-camera systems, color picture taking requires a color camera with auto-focus lens and large aperture. For example, some designs may combine a wide-field of view (FOV) fixed-focus color near camera, with a 0.95 mm aperture, and narrow-FOV auto-focus monochromatic far camera with 3.7 mm aperture. Even still, color image quality provided to the near camera will be inferior due to the small aperture leading to noisy images and due to close focusing leading to blurry images. Designers have turned to a third camera that would be needed for color imaging systems, thereby increasing the size and cost of the underlying devices.

There is a need for cost and space saving in barding reading devise. In particular, there is a desired to replace multi-camera imaging devices while achieving multiple performance targets like reading barcodes fast and over long distance range while taking high-quality color images.

SUMMARY

In some aspects, the techniques described herein relate to an indicia reader including: an imaging assembly comprising an optical variable focus lens assembly, an optical variable aperture, and an imager configured to capture images of a field of view of the indicia reader; a controller in communication with the optical variable focus lens assembly and with the optical variable aperture, the controller configured to control a focus of the lens assembly and an entrance pupil defined by the optical variable aperture; and a processor and computer-readable media storage having machine readable instructions stored thereon that, when the machine readable instructions are executed, cause the imaging assembly to: operate the indicia reader in at least one of two modes for capturing image data, a first mode having a first entrance pupil and a second mode having a second entrance pupil larger than the first entrance pupil, wherein the first mode is a fixed focus position mode and the second mode is an autofocus mode.

In some aspects, the techniques described herein relate to an indicia reader, wherein the machine readable instructions include instructions that when executed, cause the imaging assembly to: communicate the image data to a first image processing process in response to the indicia reader being in the first mode and to a second imaging processing process in response to the indicia reader being in the second mode.

In some aspects, the techniques described herein relate to an indicia reader, wherein the first imaging processing process is a barcode decoding process and wherein the second imaging processing process is color imaging process.

In some aspects, the techniques described herein relate to an indicia reader, wherein the first imaging processing process is a barcode decoding process and wherein the second imaging processing process is barcode decoding process.

In some aspects, the techniques described herein relate to an indicia reader, wherein the second mode has a focus distance range that extends farther from the indicia reader than the fixed focus position of the first mode.

In some aspects, the techniques described herein relate to an indicia reader, wherein in the first mode the indicia reader is configured to capture the image data over a first field of view having a different size than a second field of view over which the indicia reader is capture the image data in the second mode.

In some aspects, the techniques described herein relate to an indicia reader, wherein in the first mode the indicia reader is configured to capture the image data over a first field of view having the same size as a second field of view over which the indicia reader is capture the image data in the second mode.

In some aspects, the techniques described herein relate to an indicia reader, the imager is a color camera.

In some aspects, the techniques described herein relate to an indicia reader, wherein the machine readable instructions include instructions that when executed, cause the imaging assembly to: capture the image data as monochromatic image data in the first mode; and capture the image data as a monochromatic image data in the second mode.

In some aspects, the techniques described herein relate to an indicia reader, wherein the machine readable instructions include instructions that when executed, cause the imaging assembly to: capture the image data as monochromatic image data in the first mode; and capture the image data as a color image data in the second mode.

In some aspects, the techniques described herein relate to an indicia reader, wherein the machine readable instructions include instructions that when executed, cause the imaging assembly to: apply a first image binning process to the image data captured in the first mode and apply a second image binning process different than the first image binning process to the image data captured in the second mode.

In some aspects, the techniques described herein relate to an indicia reader, wherein the first binning process and the second binning process are monochromatic binning processes.

In some aspects, the techniques described herein relate to an indicia reader, wherein the first binning process is a monochromatic binning process and the second binning process is a color binning process.

In some aspects, the techniques described herein relate to an indicia reader, wherein the machine readable instructions include instructions that when executed, cause the imaging assembly to: operate the indicia reader in a third mode for capturing image data, the third mode having a third entrance pupil and wherein the third is an autofocus mode.

In some aspects, the techniques described herein relate to an indicia reader, wherein the first mode is a wide field of view monochromatic mode, the second mode is a narrow field of view monochromatic mode, and the third mode is a wide field of view color mode.

In some aspects, the techniques described herein relate to an indicia reader, wherein the field of view of the wide field of view monochromatic mode is the same as the field of view of the wide field of view color mode and each being wider than the field of view of the narrow field of view monochromatic mode.

In some aspects, the techniques described herein relate to an indicia reader, wherein the machine readable instructions include instructions that when executed, cause the imaging assembly to: switch the indicia reader from the first mode to the second mode in response to distance ranging data obtained by the indicia reader, a failure to decode an indicia in the image data, contrast data determined from the image data, or phase data determined from the image data.

In some aspects, the techniques described herein relate to an indicia reader, wherein the imager is a monochromatic image sensor.

In some aspects, the techniques described herein relate to an indicia reader, wherein the indicia reader is a handheld barcode reader or a machine vision camera.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1B:
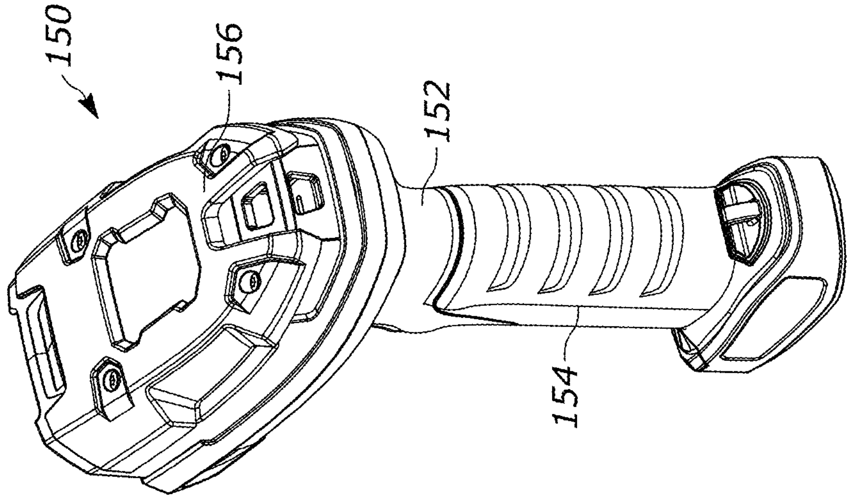
FIG. 1B illustrates a back perspective view of the handheld barcode reader of FIG. 1A, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The example imaging devices and/or systems disclosed herein utilize a single variable focus lens assembly and variable aperture to create multiple operation modes for monochromatic and polychromatic imaging, where these multiple operation modes differ in focus position and focus state (fixed or variable) and can differ in image resolution and image pixel size, in an efficient manner allowing imaging devices to capture images and perform image analysis (including indicia decoding) quickly and accurately irrespective of the distance of the indicia carrying object from the imaging device.

Figure 1A:
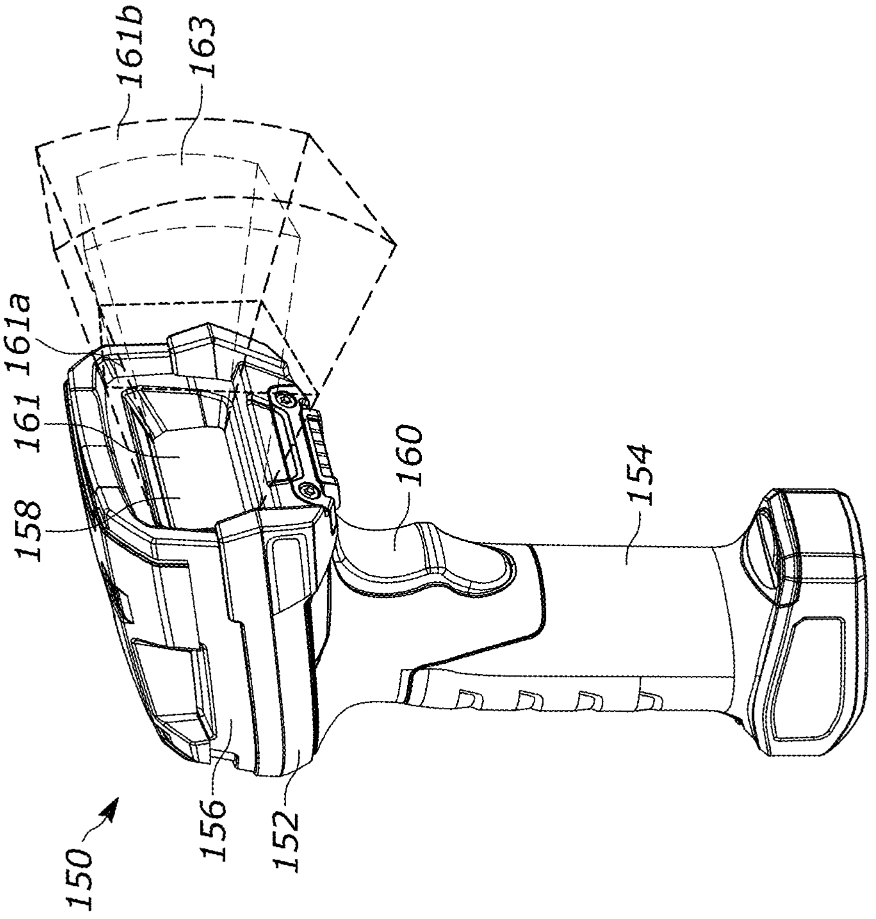
FIG. 1A illustrates a front perspective view of an example imaging device in the form of a handheld barcode reader, in accordance with embodiments described herein.

Referring first to FIGS. 1A and 1B, illustrated therein is an example imaging device. In particular, handheld imaging device 150 has a housing 152 with a handle portion 154, also referred to as a handle 154, and a head portion 156, also referred to as a scanning head 156. The head portion 156 includes a window 158 and is configured to be positioned on the top of the handle portion 154. The handle portion 154 is configured to be gripped by a reader user and includes a trigger 160 for activation by the user. Optionally included in an embodiment is also a base (not shown), also referred to as a base portion, which may be attached to the handle portion 154 opposite the head portion 156 and is configured to stand on a surface and support the housing 152 in a generally upright position. The handheld imaging device 150 can be used in a hands-free mode as a stationary workstation when it is placed on a countertop or other workstation surface. The handheld imaging device 150 can also be used in a handheld mode when it is picked up off the countertop or base station and held in an operator's hand. In the hands-free mode, products can be slid, swiped past, or presented to the window 158 for the reader to initiate barcode reading operations. In the handheld mode, the handheld imaging device 150 can be moved towards a barcode on a product, and the trigger 160 can be manually depressed to initiate imaging of the barcode.

Other implementations may provide only handheld or only hands-free configurations. In the embodiment of FIGS. 1A and 1B, the handheld imaging device 150 is ergonomically configured for a user's hand, though other configurations may be utilized as understood by those of ordinary skill in the art. As shown, the handle 154 extends below and rearwardly away from the housing 152 along a centroidal axis obliquely angled relative to a central FOV axis of a FOV of an imaging assembly within the scanning head 156.

Figure 2:
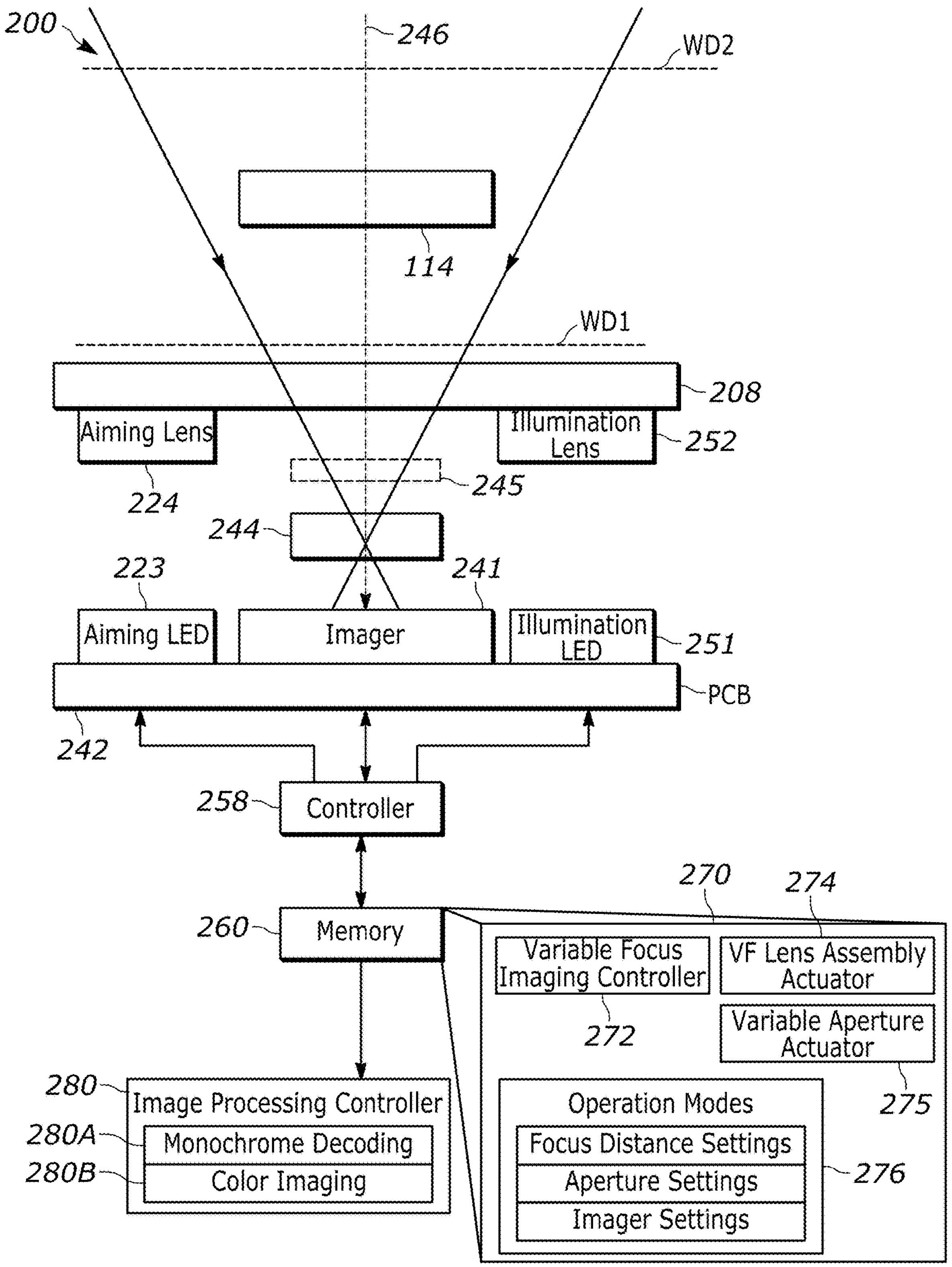
FIG. 2 illustrates a block diagram of an example imaging device such as the example barcode readers of FIGS. 1A-1B, in accordance with embodiments described herein.

In some embodiments, an imaging assembly includes a light-detecting sensor or imager operatively coupled to, or mounted on, a printed circuit board (PCB) in the handheld imaging device 150 as shown in FIG. 2. The imaging assembly (not shown) is configured to capture image data, monochromatic image data or polychromatic (color) image data, depending on operating mode, as discussed further below. The imaging assembly captures image data over a field of view (FOV) 161, which as shown in the illustrated example, spans a near distance range 161*a* and a far distance range 161*b*, from the window 158.

In some embodiments, an illuminating light assembly is also mounted in the handheld imaging device 150. The illuminating light assembly may include an illumination light source and at least one illumination lens, configured to generate a substantially uniform distributed illumination pattern of illumination light on and along an object to be read by image capture, as described below with regard to FIG. 2. For example, the illuminating light assembly can illuminate over all or part of the FOV 161. While the imaging device 150 is shown as a handheld barcode reader, in other examples, any of the imaging devices herein may be implemented as a machine vision camera or other imaging device.

Referring next to FIG. 2, a block diagram of an example architecture for an imaging device such as the handheld imaging device 150 is shown. For at least some of the reader implementations, an imaging assembly of the imaging device 200 includes a light-detecting sensor or imager 241 operatively coupled to, or mounted on, a printed circuit board (PCB) 242 in the imaging device 200 as shown in FIG. 2. In an implementation, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imager 241 over a field of view along an imaging axis 246 through the window 208. The imager 241 may also include and/or function as a color sensor. It should be understood that the terms "imager", "image sensor", and "imaging sensor" are used interchangeably herein. Depending on the implementation, imager 241 may include a color sensor such as a vision camera. In some implementations, the imager 241 is or includes a barcode reading module (e.g., a monochromatic imaging sensor). In further implementations, the imager 241 additionally or alternatively is or includes a vision color camera (e.g., a color imaging sensor). It will be understood that, although imager 241 is depicted in FIG. 2 as a single block, that imager 241 may be multiple sensors spread out in different locations of imaging device 200.

The example imaging devices and/or systems disclosed herein may utilize a mono-binning operation to convert color images to reduced resolution monochromatic images. For example, the imager 241 may be a high-resolution color imaging sensor capable of capturing color images in certain operating modes and converting the color images to reduced resolution monochromatic images in other operating modes. For example, color images may be used to capture color image data of the object 114, and monochromatic images may be used to capture reduced resolution image data for decoding an indicia on the object 114. As used herein, "decode indicia" refers to one or more features of an image used to perform a decode operation (e.g., a barcode, QR code, payload-encoding watermark, etc.), and therefore encodes a payload. Similarly, as used herein, "reduced resolution monochromatic image" may refer to any monochromatic image that has a reduced resolution compared to a color image of the same field of view (FOV) (e.g., as converted from the color image, such as via mono-binning techniques as described herein). In some implementations, standard techniques for barcode reading using a color image may include utilizing a full-resolution Y-channel (brightness) of a color YUV image (e.g., an image with a luminance/brightness Y and a chrominance of UV). The YUV image may be obtained from a raw image (e.g., a Bayer pattern image) by a series of image processing steps optimized for visual quality of color image. The instant techniques may utilize mono-binning in converting a color image to a reduced resolution monochromatic image for fast decoding, in addition to and/or in place of techniques such as white balance, demosaicing, color balance, Gamma-correction, noise filtering, edge sharpening, and RGB-to-YUV transformation.

The return light is scattered and/or reflected from an object 114 over the field of view. A imaging lens 244 is operative for focusing the return light onto the array of image sensors to enable the object 114 to be imaged. In particular, the light that impinges on the pixels is sensed and the output of those pixels produces image data that is associated with the environment that appears within the FOV (which can include the object 114). This image data is typically processed by a controller (usually by being sent to a decoder) which identifies and decodes decodable indicia captured in the image data. Once the decode is performed successfully, the reader can signal a successful "read" of the object 114 (e.g., a barcode). The object 114 may be located anywhere in a working range of distances between a close-in working distance (WD1) and a far-out working distance (WD2). In an implementation, WD1 is about one-half inch from the window 208, and WD2 is about thirty inches from the window 208.

In various embodiments, the image lens 244 is an optical variable focus lens assembly having a controllable focusing distance for the capturing image data onto the imager 241. Further, an optical variable aperture 245 is positioned between the window 208 and the variable focus lens assembly 244 and separately controllable for controlling an entrance pupil for the variable focus lens assembly 244, to further narrow the effective FOV of captured image data. For example, as discussed further herein, the imaging device 200 may be an indicia reader operable in at least two modes for capturing image data by the imager 241, a first mode in which the variable aperture 245 is set to a first entrance pupil size and a second mode in which the variable aperture 245 is set to a second entrance pupil size that is larger than the first entrance pupil. The first operation mode may be a fixed focus position mode, where the focus distance of the variable focus lens assembly 244 is set to a fixed distance, and the second mode may be an autofocus mode, where the variable focus lens assembly 244 has a varying focus distance during image capture.

An illuminating light assembly may also be mounted in, attached to, or associated with the imaging device 200. The illuminating light assembly includes an illumination light source 251, such as at least one light emitting diode (LED) and at least one illumination lens 252, and preferably a plurality of illumination and illumination lenses, configured to generate a substantially uniform distributed illumination pattern of illumination light on and along the object 114 to be imaged by image capture. Although FIG. 2 illustrates a single illumination light source 251, it will be understood that the illumination light source 251 may include more light sources. At least part of the scattered and/or reflected return light is derived from the illumination pattern of light on and along the object 114.

An aiming light assembly may also be mounted in, attached to, or associated with the imaging device 200 and preferably includes an aiming light source 223, e.g., one or more aiming LEDs or laser light sources, and an aiming lens 224 for generating and directing a visible aiming light beam away from the imaging device 200 onto the object 114 in the direction of the FOV of the imager 241. It will be understood that, although the aiming light assembly and the illumination light assembly both provide light, an aiming light assembly differs from the illumination light assembly at least in the type of light the component provides. For example, the illumination light assembly provides diffuse light to sufficiently illuminate an object 114 and/or an indicia of the object 114 (e.g., for image capture). An aiming light assembly instead provides a defined illumination pattern (e.g., to assist a user in visualizing some portion of the FOV). Similarly, in some implementations, the illumination light source 251 and the aiming light source 223 are active at different, non-overlapping times. For example, the illumination light source 251 may be active on frames when image data is being captured and the aiming light source 223 may be active on frames when image data is not being captured (e.g., to avoid interference with the content of the image data).

In further implementations, the imaging device 200 may additionally emit an auditory cue, such as a chime, beep, message, etc. In still further implementations, the imaging device 200 may provide haptic feedback to a user, such as vibration (e.g., a single vibration, vibrating in a predetermined pattern, vibrating synchronized with flashing, etc.).

Further, the imager 241, the illumination source 251, and the aiming source 223 are operatively connected to a controller or programmed controller 258 (e.g., a microprocessor facilitating operations of the other components of imaging device 200) operative for controlling the operation of these components. In some implementations, the controller 258 functions as or is communicatively coupled to a vision application processor for receiving, processing, and/or analyzing the image data captured by the imager 241.

A memory 260 is connected and accessible to the controller 258. Preferably, the controller 258 is the same as the one used for processing the captured return light from the illuminated object 114 to obtain data related to the object 114. Though not shown, additional optical elements, such as collimators, lenses, apertures, compartment walls, etc. may be provided in the housing. Although FIG. 2 shows the imager 241, the illumination source 251, and the aiming source 223 as being mounted on the same PCB 242, it should be understood that different implementations of the imaging device 200 may have these components each on a separate PCB, or in different combinations on separate PCBs. For example, in an implementation of the imaging device 200, the illumination LED source is provided as an off-axis illumination (i.e., has a central illumination axis that is not co-axial with the central FOV axis).

In the illustrated example, the controller 258 includes an imaging controller 270 configured to control the variable focus lens assembly 244 and variable aperture 245 such that the imaging device 200 is a single-camera system emulating multi-camera system. In the illustrated example, the imaging controller 270 has a variable focus imaging controller 272 coupled to the variable focus lens assembly 244 and controls the same to define one or more discrete imaging planes for the imaging sensor 241, imaging planes within the FOV. The one or more discrete imaging planes may be considered one or more focal planes as described here. The focal plane of the imaging sensor 241 is the imaging plane that is expected to result in the highest efficiency of decoding of indicia and performing machine vision processes, which may depend on an edge sharpness value or another property of an image. In the illustrated example, the variable focus imaging controller 272 is coupled to the variable focus lens assembly 244 through an actuator control unit 274. The actuator control unit 274, while shown separately, may be integrated into the variable focus lens assembly 244. In some embodiments, actuator control unit 274 may include a focusing lens drive, a shift lens drive, a zoom lens drive, an aperture drive, angular velocity drive, voice coil motor drive, and/or other drive units for controlling operation of the variable focus lens assembly 244, which itself may comprise multiple lens, lens stages, etc.

The variable focus (VF) lens assembly 244 may be a deformable lens element, a liquid lens, a T-lens, an electrically tunable lens, or another VF optical element. In some embodiments, the optical element includes a voice coil actuator motor in the actuator control unit 274 that is controllably adjusted by the controller 274. While the variable aperture 245 is illustrated as separate from the variable focus lens assembly 244, in some examples, the variable aperture 245 is integrated into the variable focus lens assembly 244.

As noted above, the imaging controller 270 is configured to control both the variable focus lens assembly 244 and the variable aperture 245 such that the imaging device 200 is a single-camera system emulating multi-camera system. Therefore, in some examples, the imaging controller 270 further includes a variable aperture actuator 275 for controlling, in response to the controller 272, the entrance pupil size of the variable aperture 245. For example, that entrance pupil can be adjusted between 0.6 mm to 5 mm, in diameter, in some examples.

In example embodiments, the imaging device 200 (or the imaging device 150) through controller 258 is configured to operate in one of a plurality of different modes 276. In some examples, each mode is defined by a different settings, a focus distance settings, aperture size settings, and imager pixel count/position settings. In an example, a first operation mode may be a fixed focus position mode, where the controller 258 accesses data stored in the modes 276 to control operation of both the variable focus lens assembly 244 and the variable aperture 245 such that the imaging device captures image data at fixed focus distance and at a predetermined entrance pupil (corresponding to a numerical aperture) size. This first operation mode corresponds to a portion of the FOV, such as a central portion of the imager 241. A second operation mode may be an autofocus mode, where the controller 258 accesses data stored in the modes 276 to control operation of both the variable focus lens assembly 244 and the variable aperture 245 to varying focus distance during image capture, i.e., through an autofocus operation. The second operation mode corresponds to another portion of the FOV, which portion may be different than or the same as the portion of the FOV for the first mode. In each of the different modes, image data may be captured and processed by an image processing controller 280, as shown. The controller 280, however, may process the received image data from the controller 258 (or memory 260 or directly from the imager 241), according to the operation mode within which the data was captured. In the illustrated example, the image processing controller 280 includes two different image processing processes: a monochromatic decoding process 280A in which received color image data is binned to monochromatic image data and a decoding process is performed and a color imaging process 280B in which the received color image data is processed as color image data. Thus, FIG. 2 illustrates an example imaging device 200 configured to operation in different operation modes, which can vary in focus distance, aperture size (depth of field), and sensor mode for the imager 241. The table below illustrates an example of three (3) different modes of operation, although it will be appreciated that other modes of operation and fewer or larger numbers of modes may be implemented.

TABLE 1

| Mode | Aperture, mm | Focus distance | Sensor mode | FOV, deg |
|---|---|---|---|---|
| 1 | 0.8 | Fixed 8 in | 4 × 4 mono-binned | 38 × 28 |
| 2 | 3.6 | AF 8 in-INF | 2 × 2 mono-convolution, 2× cropped | 19 × 14 |
| 3 | 3.6 | AF 8 in-INF | 2 × 2 color binning | 38 × 28 |

Thus, Table 1 shows three operation modes in this example. Operation Mode 1 is a wide-FOV mono fixed-focus camera for barcode reading at close distances. This mode may be an example of a wide field of view monochromatic mode. Operation Mode 2 is narrow-FOV mono auto-focus camera for barcode reading at far distances. That is, this mode may be an example of a narrow field of view monochromatic mode. Operation Mode 3 is wide-FOV color auto-focus camera for image taking. That is, this mode may be an example of a wide field of view color mode. The data in Table 1 is based on an example using a 16MP-1.2 um color sensor (4656×3496) with a variable focus imaging lens having an effective focal length (EF)=8 mm and with two aperture modes on an integrated variable aperture (0.8 mm and 3.6 mm) and that results in a focus distance range of 8 inches to infinity.

While not illustrated, the imaging device 200 (or the imaging device 150) may further include a network input/output (I/O) interface for connecting to a server, other processing system, or other imaging device through wired or wireless network connection. In some examples, that server, other processing system, or other imaging device is part of an inventory management system. These devices may be connected via any suitable communication means, including wired and/or wireless connectivity components that implement one or more communication protocol standards like, for example, TCP/IP, WiFi (802.11b), Bluetooth, Ethernet, or any other suitable communication protocols or standards. The imaging device 200 (or the imaging device 150) may further include a display for providing information such as visual indicators, instructions, data, and images to a user. The server (and/or other connected devices) may be located in the same location as the imaging device or at a remote location, such as on a cloud-platform or other remote location. In still other embodiments, the server (and/or other connected devices) may be formed of a combination of local and cloud-based computers. Further, an input/output interface may be provided for connecting to user input or other external peripheral device.

Figure 3:
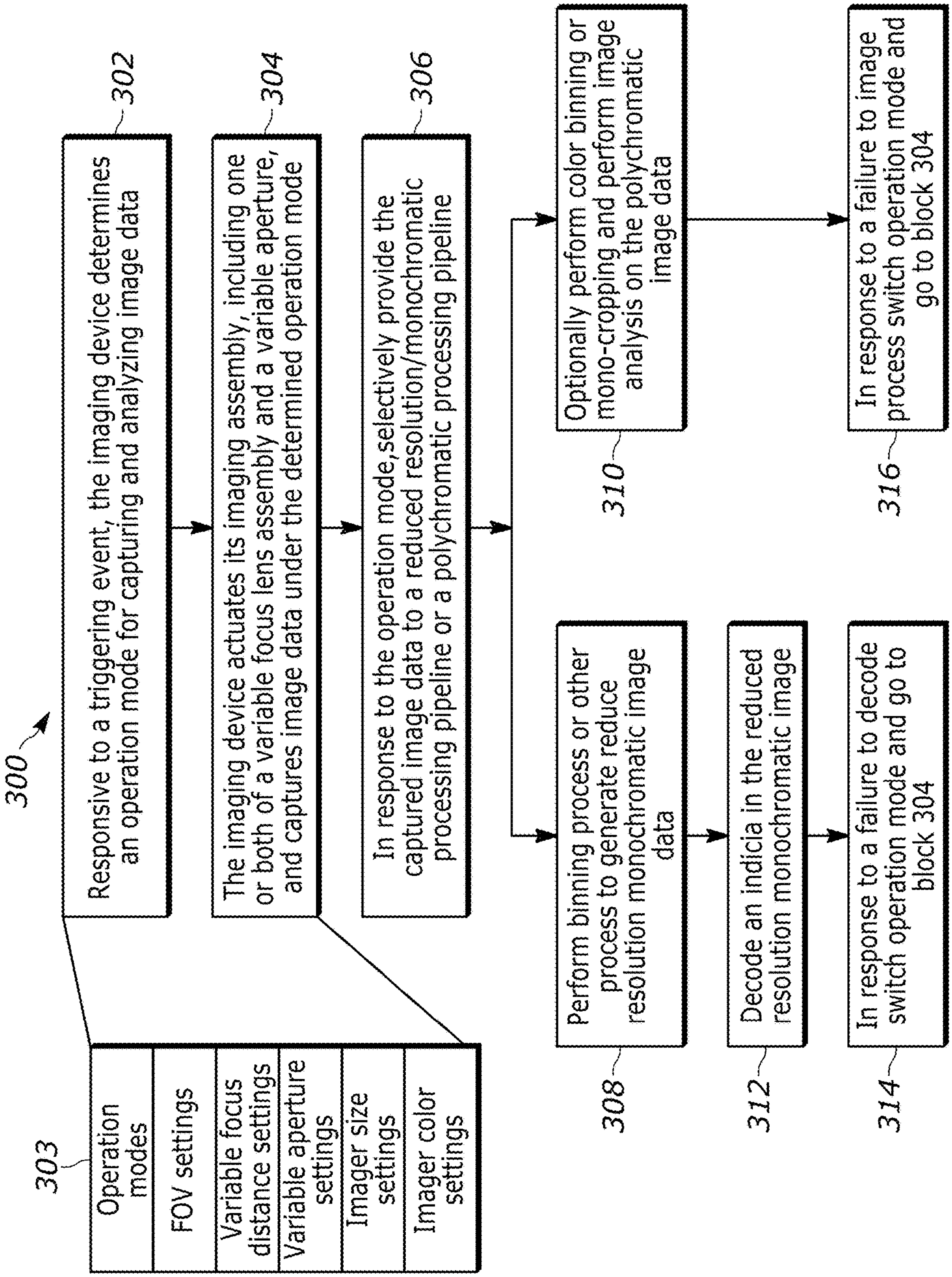
FIG. 3 illustrates a block diagram of an example system including a single variable focus imaging assembly with variable aperture, in accordance with embodiments described herein.

FIG. 3 illustrates a process 300 for image scanning using an imaging device, such as imaging devices 150 and 200, and in particular to emulate a multiple camera system using a single camera or single imager. At a block 302, the process 300 is initiated in response to a triggering event at an imaging device, such as a user activating a trigger or a user moving an object into a FOV of the imaging device. Responsive to the trigger event, the imaging device determines an operation mode from a plurality of operation modes 303 stored in memory on the imaging device. These operation modes may be formed of settings that have different values across different modes. Each operation mode may be characterized by a FOV size settings, variable focus distance settings, variable aperture settings on entrance pupil size, imager size settings for example in pixel array size, and imager color settings for example whether the images for that operation mode are to be binned or otherwise converted to a monochromatic image, such as a reduced resolution monochromatic image, or maintained as a polychromatic (or color image). In some examples, the imaging device, at block 302, may access a default operation mode or a last used operation mode. In some examples, the imaging device may do preliminary preprocessing on an initial captured image to determine the operation mode.

In the illustrated example, at the block 304, the process 304 controls operation of the variable focus lens assembly (such as the variable lens assembly 244) and the variable aperture (such as the variable aperture 245) based on the selected mode. For example, the block 304 may selectively operate the variable focus lens assembly in a fixed focus position mode or an autofocus mode, depending on the selected operation mode. Further, the block 304 may set the entrance pupil size of the variable aperture 245 based on the selected operation mode. The block 304 may further limit the size of the pixel array portion of the imager used to generate image data from capture images based on the selected operation mode. In various examples, an autofocus operation mode may have a focus distance range that extends farther from the imaging device than the fixed focus position of another operation mode. In various examples, the imaging device may be configured through block 304 such that an operation mode may capture image data over a first field of view having a different size than a second field of view over which the imaging device is capture the image data in another operation mode. In various examples, the imaging device is configured to capture image data over the same field of view across multiple operation modes.

In the illustrate example, the captured image data of block 304 is provided to a block 306 where it is determined, based on the operation mode, whether the image data is to be provided to a reduced resolution monochromatic image processing, block 308, or a polychromatic image processing, block 310. In other examples, the block 304, in response to operation mode, is configured to capture raw data as monochromatic image data. As discussed in various examples here, one or more or all of the operation modes available at block 302 may result in capturing image data that is monochromatic image data. Although in other examples, at least one mode captures (or generates) image data as monochromatic image data, and another mode captures (or generates) image data as color image data.

In the illustrated example, the process 300, via the block 306, thus communicates captured image data to a first image processing process 308 in response to the imaging device being in the first mode and to a second imaging processing process 310 in response to the imaging device being in the second mode. While multiple different processing pipelines may be implemented, one for each operation mode, in some examples, multiple operation modes may be fed to the same processing pipeline. In the illustrated example, the processing pipeline beginning at block 308 is an indicia (e.g., barcode) decoding processing pipeline, and the processing pipeline beginning at block 310 is an imaging processing pipeline that may or may not be configured as a barcode decoding process.

In the illustrated example, the block 308 is configured to process captured image data by selectively applying a mono-binning color analysis processes for processing color images using mono-binning techniques to generate a reduced resolution monochromatic image.

The binning processes herein may define and/or utilize superpixels of pixels to perform a mono-binning process. In particular, the binning processes may define or receive an indication of a group of pixels to make up a larger superpixel. Depending on the implementation, the superpixel may be a 2×2 pixel superpixel, 4×4 pixel superpixel, 8×8 pixel superpixel, and/or any other such sized superpixel. In some implementations, the superpixel may have an equal height to length pixel count (e.g., 2 pixels by 2 pixels) or different height to length pixel counts (e.g., 2 pixels by 4 pixels). In further implementations, the superpixel height and/or length pixel count(s) may be specifically designed and/or defined to be a multiple of 2 (e.g., 2 pixels, 4 pixels, 6 pixels, etc.), equivalent to $2^x$, (e.g., 2, 4, 8, etc.), or any pixel group size (e.g., 2×2, 3×3, 4×4, etc.). The binning processes may receive one or more photo-electrons via each superpixel indicative of photons striking the elements of the color imaging sensor corresponding to the various pixels of the superpixel. By way of example, the superpixel may include four pixels (e.g., a red pixel, a blue pixel, and two green pixels) of the polychromic image data. For color imaging and analysis, the photo-electrons transmitted responsive to the photons striking the corresponding elements are representative of the corresponding colors, and the color image is generated accordingly. However, for the mono-binning process of the block 308, the photo-electron counts for the individual pixels within the superpixel may be combined to determine a composite photo-electron count representative of the intensity of a corresponding portion of the generated reduced resolution monochromatic image. Depending on the implementation, the photo-electron count for the pixels may be added, averaged, etc. to generate a superpixel photo-electron count. The superpixel photo-electron count may similarly be averaged, added, and/or otherwise combined to determine larger portions (e.g., a subset, overall, etc.) photo-electron count from the image sensor. The binning processes therefore generate a binned image, which may be subsequently input into a decoder for a decoding process (e.g., at block 312 or at block 310). In further implementations, the binned image may be input into other modules to perform other functionalities associated with monochromatic images. As such, by utilizing the respective superpixels rather than the individual color-filtered pixels via a mono-binning process, the binning processes convert a color image to monochrome (e.g., for decoding purposes). Similarly, because the composite photo-electron counts are combined, the noise pattern is smoothed and the resolution is lowered, generating a low-resolution binned image.

In various examples, each of the processing blocks 308 and 310 may apply a different binning processes depending on the operation mode. For example, in the illustrated example, the process of block 308 may perform operation Mode 1 from Table 1, and the process of block 310 may perform operation Mode 1 and Mode 2 from Table 1. That is, in some examples, the block 310 may optionally perform a color binning process according to an operation mode (Mode 2) or a monochromatic binning process that crops a received image data according to another operation mode (Mode 3). The monochromatic binning process in block 310 may include cropping the image data to a smaller portion of the imager than the mono-binning of block 308 which allows the process at block 310 to process images in an autofocus mode (of the variable focus lens assembly) used for farther distance range objects compared to the image data processed by the block 308 which is configured to analyze objects in a near distance, fixed focus position range.

In the illustrated example, the reduced resolution monochromatic image data from block 308 is provided to block 312 which performs a decode operation on indicia within that image data. At a block 314, in response to the block 312 failing to decode an indicia, the imaging device switches to a different operation mode and control is passed back to block 304 for capturing and processing subsequent image data. In some examples, in response to a failure to decode an indicia in the reduced resolution image data control is passed back to the block 302 for determining a next operation mode. Similarly, in response to the process at the block 310 failing to process image data, a block 316 may switch to a different operation mode and control is passed back to the block 304 for capturing and processing subsequent image data. In some examples, the image processing of block 310 may be indicia decoding process, in which case the block 316 switches operation mode in response to a failure to decode an indicia in the image data at the block 310. In some examples, the blocks 312, executing autofocus operation modes, perform distance ranging processes adjusting the variable focus distance of the variable focus lens assembly to capture in focus image data and to decode indicia therein. In such some examples, the block 314 may switch the operation mode in response to the distance ranging data obtained from the block 310, in response to a failure to decode an indicia in the image data, in response to contrast data determined from the image data at the block 308, and/or phase data determined from the image data determined at the block 308. Similarly, the block 314 may switch operation modes in response to autofocus data, a failure to decode an indicia, contrast data from image data, and/or phase data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms “comprises,” “comprising,” “has”, “having,” “includes”, “including,” “contains”, “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a”, “has . . . a”, “includes . . . a”, “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially”, “essentially”, “approximately”, “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “coupled” as used herein is defined as connected, although not necessarily directly and not necessarily mechanically. A device or structure that is “configured” in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An indicia reader comprising:

an imaging assembly comprising an optical variable focus lens assembly, an optical variable aperture, and an imager configured to capture images of a field of view of the indicia reader;

a controller in communication with the optical variable focus lens assembly and with the optical variable aperture, the controller configured to control a focus of the lens assembly and an entrance pupil defined by the optical variable aperture; and a processor and computer-readable media storage having machine readable instructions stored thereon that, when the machine readable instructions are executed, cause the imaging assembly to:

operate the indicia reader in at least one of two modes for capturing image data, a first mode having a first entrance pupil and a second mode having a second entrance pupil larger than the first entrance pupil, wherein the first mode is a fixed focus position mode and the second mode is an autofocus mode; and communicate the image data to a first image processing process in response to the indicia reader being in the first mode and to a second imaging processing process in response to the indicia reader being in the second mode.

2. The indicia reader of claim 1, wherein the first imaging processing process is a barcode decoding process and wherein the second imaging processing process is color imaging process.

3. The indicia reader of claim 1, wherein the first imaging processing process is a barcode decoding process and wherein the second imaging processing process is barcode decoding process.

4. The indicia reader of claim 1, wherein the second mode has a focus distance range that extends farther from the indicia reader than the fixed focus position of the first mode.

5. The indicia reader of claim 4, wherein in the first mode the indicia reader is configured to capture the image data over a first field of view having a different size than a second field of view over which the indicia reader is capture the image data in the second mode.

6. The indicia reader of claim 4, wherein in the first mode the indicia reader is configured to capture the image data over a first field of view having the same size as a second field of view over which the indicia reader is capture the image data in the second mode.

7. The indicia reader of claim 1, wherein the imager is a color camera.

8. The indicia reader of claim 7, wherein the machine readable instructions include instructions that when executed, cause the imaging assembly to:

capture the image data as monochromatic image data in the first mode; and capture the image data as a monochromatic image data in the second mode.

9. The indicia reader of claim 7, wherein the machine readable instructions include instructions that when executed, cause the imaging assembly to:

capture the image data as monochromatic image data in the first mode; and capture the image data as a color image data in the second mode.

10. The indicia reader of claim 1, wherein the machine readable instructions include instructions that when executed, cause the imaging assembly to:

apply a first image binning process to the image data captured in the first mode and apply a second image binning process different than the first image binning process to the image data captured in the second mode.

11. The indicia reader of claim 10, wherein the first binning process and the second binning process are monochromatic binning processes.

12. The indicia reader of claim 10, wherein the first binning process is a monochromatic binning process and the second binning process is a color binning process.

13. The indicia reader of claim 1, wherein the machine readable instructions include instructions that when executed, cause the imaging assembly to:

operate the indicia reader in a third mode for capturing image data, the third mode having a third entrance pupil and wherein the third is an autofocus mode.

14. The indicia reader of claim 13, wherein the first mode is a wide field of view monochromatic mode, the second mode is a narrow field of view monochromatic mode, and the third mode is a wide field of view color mode.

15. The indicia reader of claim 14, wherein the field of view of the wide field of view monochromatic mode is the same as the field of view of the wide field of view color mode and each being wider than the field of view of the narrow field of view monochromatic mode.

16. The indicia reader of claim 13, wherein the imager is a monochromatic image sensor.

17. The indicia reader of claim 1, wherein the machine readable instructions include instructions that when executed, cause the imaging assembly to:

switch the indicia reader from the first mode to the second mode in response to distance ranging data obtained by the indicia reader, a failure to decode an indicia in the image data, contrast data determined from the image data, or phase data determined from the image data.

18. The indicia reader of claim 1, wherein the indicia reader is a handheld barcode reader.

19. The indicia reader of claim 1, wherein the indicia reader is a machine vision camera.

* * * * *